J. S. PADON.
Wheel-Cultivator.
No. 36,019
Patented July 29, 1862.
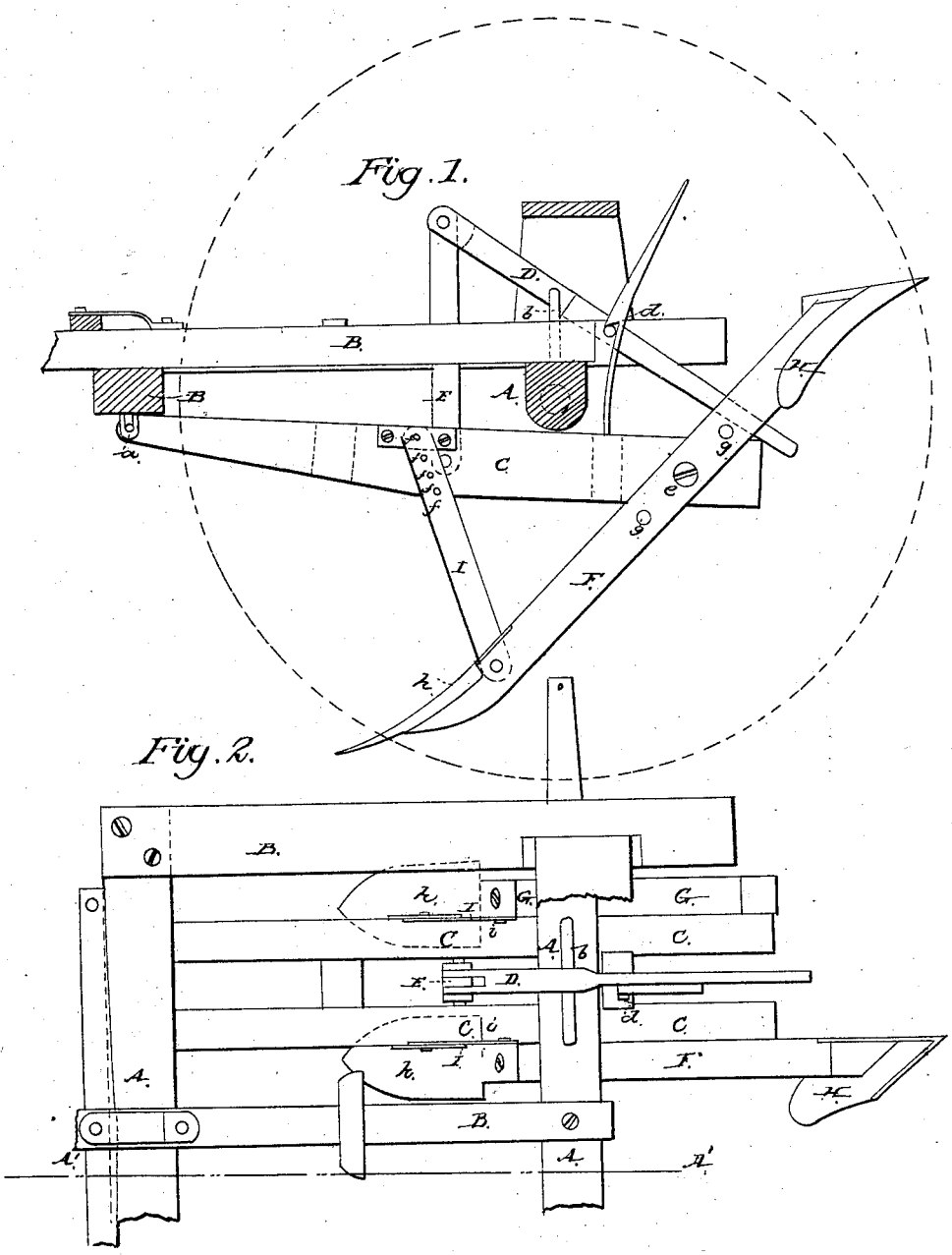

UNITED STATES PATENT OFFICE.

J. S. PADON, OF SUMMERFIELD, ILLINOIS.

IMPROVEMENT IN CULTIVATORS.

Specification forming part of Letters Patent No. 36,019, dated July 29, 1862.

*To all whom it may concern:*

Be it known that I, J. S. PADON, of Summerfield, in the county of St. Clair and State of Illinois, have invented certain new and useful Improvements in Cultivators; and I do hereby declare the following to be a full, clear, and exact description of the same, reference being had to the annexed drawings, making part of this specification, in which—

Figure 1 is a top view of little more than half of my said improved machine, with a part of the driver's seat broken out so as to expose the works beneath. Only half of the machine is shown by the drawings. The other half being precisely the same it is unnecessary to show it. Fig. 2 is a vertical longitudinal section of the machine taken on the line A' A'.

The wheels upon which the machine is mounted are not shown in the drawings. They are of the ordinary construction, applied in the ordinary way, and need, therefore, no description.

My invention consists in combining in a certain way several distinctive features of certain character in one machine, by which it is made cheap, simple, and efficient in plowing and cultivating corn and other plants.

The following description of my invention will enable any one skilled in the art to which it appertains to make and use it.

Like letters of reference represent corresponding parts of the different figures of the drawings referred to.

The axle of the machine is represented by A, upon which the main frame B is mounted in the manner shown.

An adjustable frame is shown by C, pivoted at $a$, and connected to the lever D by means of the link E. The fulcrum of said lever is shown by $b$. By means of this lever and its connections the frame C is raised or lowered from or to the ground, as the case may require. In the rear end of said frame a spring-catch is arranged, which catches over a pin fixed in the lever at $d'$ when the frame is raised for the purpose of holding it in the required position. Only one catch is shown on the spring; but they may, of course, be increased as circumstances may require.

The plow and cultivator beam is represented by F. It is pivoted at $e$ to the rear end of the frame C; but the cultivator-beam is shown by G. It is pivoted to the rear end of the frame C in the same manner the beam F is, and is like it in every respect, excepting only the extension of the latter above the frame C for the plow H. Both of the beams aforesaid are supported and united to the frame C by means of adjustable links I at their forward ends. The said link is pivoted to the beams aforesaid and also to the frame C, and holes $ff$ are made in its upper end, by which means the front end of the beams may be raised or lowered, so as to make the cultivator skim the ground or cut a deep furrow in it in obedience to the will of the attendant.

If it be desired to make the cultivator cut deep in the ground and pass easily through it, so as to just break and loosen it without turning it over, it may be done by dropping the rear end of the frame C and raising the front end of the beams, by which the depth and angle are at once obtained.

If it be desired to use a plow instead of a cultivator, it may be done by turning the beam F the other end up from what is shown on the drawings, by which means the plow H is brought in contact with the ground, holes being made in the beam at $g$ to adjust it the desired height from the ground.

The inside flanges of the cultivator $h$ are made wider than the outside ones, as shown by the dotted lines $i\ i$, and they are made so that they may be transposed. By these means the dirt is made to approximate more or less to the plants.

Having now described the construction and operation of my invention, I claim and desire to secure by Letters Patent—

The arrangement of the adjustable frame C and beams F and G in respect to each, and under the main frame B, when constructed and operated in the manner described and shown.

J. S. PADON.

Witnesses:
ROLLIN B. GRAY,
CHARLES MALLORY.